US008749717B2

(12) United States Patent
Wang et al.

(10) Patent No.: US 8,749,717 B2
(45) Date of Patent: Jun. 10, 2014

(54) METHOD, APPARATUS AND REMOTE CONTROL FOR ANNULAR-SELECTOR BASED TELEVISION INTERACTION

(71) Applicant: Shenzhen Skyworth-RGB Electronics Co. LTD, Shenzhen (CN)

(72) Inventors: Zhi-Guo Wang, Shenzhen (CN); Si-Hua Huang, Shenzhen (CN); Rong Shen, Shenzhen (CN); Wei-Long Lv, Shenzhen (CN); Wei-Ji Chen, Shenzhen (CN); Na Qi, Shenzhen (CN); Feng-An Zhou, Shenzhen (CN); Wei Xiong, Shenzhen (CN); Ni He, Shenzhen (CN)

(73) Assignee: Shenzhen Skyworth-RGB Electronics Co. Ltd., Shenzhen, Guangdong Prov. (CN)

(*) Notice: Subject to any disclaimer, the term of this patent is extended or adjusted under 35 U.S.C. 154(b) by 0 days.

(21) Appl. No.: 13/955,702

(22) Filed: Jul. 31, 2013

(65) Prior Publication Data
US 2014/0043542 A1     Feb. 13, 2014

(30) Foreign Application Priority Data

Aug. 8, 2012    (CN) .......................... 2012 1 0280611

(51) Int. Cl.
*H04N 5/44*     (2011.01)
(52) U.S. Cl.
USPC .......................................... 348/734; 348/725

(58) Field of Classification Search
USPC ................. 348/725, 734, 563, 564, 569; 340/12.22, 12.3, 12.31, 12.5, 12.51; 725/37, 60, 61, 139, 151
IPC ...................................... H04N 5/44,5/445, 5/70
See application file for complete search history.

(56) References Cited

U.S. PATENT DOCUMENTS

| | | | |
|---|---|---|---|
| 6,211,921 B1 * | 4/2001 | Cherian et al. ................ | 348/565 |
| 7,091,998 B2 * | 8/2006 | Miller-Smith ................ | 348/563 |
| 8,138,942 B2 * | 3/2012 | Otsuka et al. ............ | 340/815.78 |
| 8,531,392 B2 * | 9/2013 | Branton et al. ................ | 345/156 |
| 2007/0035518 A1 * | 2/2007 | Francz et al. ................. | 345/163 |
| 2010/0053464 A1 * | 3/2010 | Otsuka ......................... | 348/734 |

* cited by examiner

*Primary Examiner* — Sherrie Hsia
(74) *Attorney, Agent, or Firm* — Morris Manning & Martin LLP; Tim Tingkang Xia, Esq.

(57) ABSTRACT

The invention provides method and apparatus and remote control for annular-selector based television interaction. The method includes receiving rotation information of an annular selector sent by a remote control provided with the annular selector; obtaining a rotational displacement of a menu or cursor according to the rotation information; redrawing the menu or cursor on a display interface according to the rotational displacement, so as to control the menu or cursor to rotate according to the rotational displacement; and receiving a confirmation signal sent by the remote control, and selecting an option, corresponding to a position where the cursor is, on the menu. For operational designs of the annular selector, a menu interface is presented in an annular manner, and annularly rotational animations is adopted, so that an action of the user match a corresponding display on the television, thereby improving a human-computer interaction experiences.

8 Claims, 7 Drawing Sheets

METHOD, APPARATUS AND REMOTE CONTROL FOR ANNULAR-SELECTOR BASED TELEVISION INTERACTION

CROSS-REFERENCE TO RELATED APPLICATION

This application claims the priority to Chinese Patent Application No. CN201210280611.7, filed in the State Intellectual Property Office of P.R. China, on Aug. 8, 2012, which is hereby incorporated herein in its entirety by reference.

FIELD OF THE INVENTION

The present invention relates generally to smart televisions, and more particularly to method, apparatus and remote control for annular-selector based television interaction.

BACKGROUND OF THE INVENTION

As smart phones, tablet computers, the Internet and other technologies develop, the concept of "smart" gradually enters the field of televisions. Currently, the televisions are undergoing changes from backward operations to forward operations. The conventional televisions are easy to learn and use, but provide only a few simple services. A smart television is very rich in service contents, but the interaction method is complicated, and is difficult for users to operate. How to enable users to easily operate becomes a key issue that requires television manufacturers to put efforts for improvements.

A conventional interaction method that operates a smart television has much inconvenience and complexity. For example, the Internet and smart television based online movies, application stores and other functions may provide a user with more choices on a same television interface, so that when using a conventional remote control to select a desired content therein, the user needs to press buttons such as Up, Down, Left, Right, OK, and Return, which is very cumbersome. As functions increase, a single interface cannot display all contents, so that back-and-forth jumping between different levels and pages is required. For example, when a user needs to view a video, he/she needs to enter into a home page, online movie, variety, and then performs selection, and the number of levels of the path is large. As the technologies develop, a television interface can provide a user with more and more interaction experiences, but a conventional operation method is unable to make an action of the user match a corresponding effect presented by the television, thereby limiting diversity of television interaction experiences. For example, when a rotary operating animation appears on the television, the user performs control through Left and Right buttons, thereby providing the user with the feeling that does not match.

Therefore, a heretofore unaddressed need exists in the art to address the aforementioned deficiencies and inadequacies.

SUMMARY OF THE INVENTION

On aspect of the present invention provides method, apparatus and remote control for annular-selector based television interaction, so as to make operation simple and intuitive, and effectively improve a human-computer interaction experiences.

In one aspect of the present invention, the method for annular-selector based television interaction includes receiving rotation information of an annular selector sent by a remote control provided with the annular selector; obtaining a rotational displacement of the menu or cursor on the display interface of a television according to the rotation information; redrawing the menu or cursor on the display interface according to the rotational displacement, so as to control the menu or cursor to rotate according to the rotational displacement; and receiving a confirmation signal sent by the remote control, and selecting an option, corresponding to a position in which the cursor is, on the menu.

In one embodiment, the step of receiving the rotation information of the annular selector sent by the remote control includes receiving a rotational direction and a rotational speed of the annular selector within a preset time that are sent by the remote control provided with the annular selector.

In one embodiment, the step of obtaining the rotational displacement of the menu or cursor according to the rotation information includes obtaining a rotational displacement by which the menu or cursor rotates at the rotational speed within the preset time.

In one embodiment, the step of receiving the rotation information of the annular selector sent by the remote control provided with the annular selector includes receiving a rotational direction of the annular selector and the number of strikes of striking pins of the annular selector within a preset time that are sent by the remote control provided with the annular selector.

In one embodiment, the step of obtaining the rotational displacement of the menu or cursor according to the rotation information includes according to the number of strikes of the striking pins, searching a preset transmitted-value mapping table for a corresponding external rotation force; and obtaining the rotational displacement of the menu or cursor under the external rotation force after the preset time.

In one embodiment, the method further includes, after the step of redrawing the menu or cursor on the display interface according to the rotational displacement, so as to control the menu or cursor to rotate according to the rotational displacement, obtaining a rotational displacement through which the menu or cursor decelerates to a halt after it is determined that the external rotation force is removed; and redrawing the menu or cursor on the display interface according to the deceleration-to-halt rotational displacement, so as to control the menu or cursor to rotate according to the deceleration-to-halt rotational displacement.

In another aspect of the present invention, the apparatus for annular-selector based television interaction includes a receiving module, configured to receive rotation information of an annular selector sent by a remote control provided with the annular selector; an obtaining module, configured to obtain a rotational displacement of a menu or cursor according to the rotation information; a drawing module, configured to redraw the menu or cursor on a display interface according to the rotational displacement, so as to control the menu or cursor to rotate according to the rotational displacement; and a confirmation module, configured to receive a confirmation signal sent by the remote control, and select an option, corresponding to a position in which the cursor is, on the menu.

In one embodiment, the receiving module includes a first receiving sub-module, configured to receive a rotational direction and a rotational speed of the annular selector within a preset time that are sent by the remote control provided with the annular selector, and the obtaining module includes a first displacement obtaining sub-module, configured to obtain a rotational displacement by which the menu or cursor rotates at the rotational speed within the preset time.

In another embodiment, the receiving module includes a second receiving sub-module, configured to receive a rotational direction of the annular selector and the number of strikes of striking pins of the annular selector within a preset time that is sent by the remote control provided with the annular selector.

In one embodiment, the obtaining module includes an external rotation force query sub-module, configured to, according to the number of strikes of the striking pins, search a preset transmitted-value mapping table for a corresponding external rotation force; and a second displacement obtaining sub-module, configured to obtain a rotational displacement of the menu or cursor under the external rotation force after the preset time.

In one embodiment, the obtaining module further includes a third displacement obtaining sub-module, configured to, after it is determined that the external rotation force is removed, obtain a rotational displacement through which the menu or cursor decelerates to a halt; and the drawing module is further configured to redraw the menu or cursor on the display interface according to the deceleration-to-halt rotational displacement, so as to control the menu or cursor to rotate according to the deceleration-to-halt rotational displacement.

In yet another aspect of the present invention, the remote control used in associated with the above apparatus for television interaction, includes an annular selector, operably rotatable clockwise or counterclockwise; means for acquiring rotation information of the annular selector; and a transmitter for sending the acquired rotation information of the annular selector to the apparatus that controls, according to the rotation information of the annular selector, rotation of a menu or cursor on a display interface on a television, and for sending a confirmation signal to the apparatus when a certain option of the menu on which the cursor falls is selected.

In one embodiment, the annular selector comprises an annular jog operation key.

In one embodiment, the rotation information comprises at least one of a rotational direction, a rotational speed, and a circumferential displacement.

In one embodiment, the means for the acquiring rotation information of the annular selector comprises one or more sensors.

In another embodiment, the means for the acquiring rotation information of the annular selector comprises a plurality of striking pins disposed on the annular selector, wherein the number of strikes of the striking pins per unit time and a preset spacing distance between the striking pins are acquired, so as to obtain a circumferential displacement by which the annular selector rotates, thereby determining the rotational speed.

The remote control in one embodiment further includes a confirmation key coupled with the transmitter such that the transmitter sends the confirmation signal to the apparatus when the confirmation key is activated.

According to the present invention, for operational design of an annular selector of a remote control, a visual menu interface is also expressed in an annular manner, and an annular rotational animation is also adopted for an animation effect, so that an action incurred by a user operating the remote control is consistent with a result seen on a television interface by the user. The physical operations and the visual effects match each other, the operation is simple, and the display is intuitive, so as to greatly reduce operation complexity and fatigue, thereby effectively improving a human-computer interaction experiences.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION OF THE INVENTION

Figure 1:
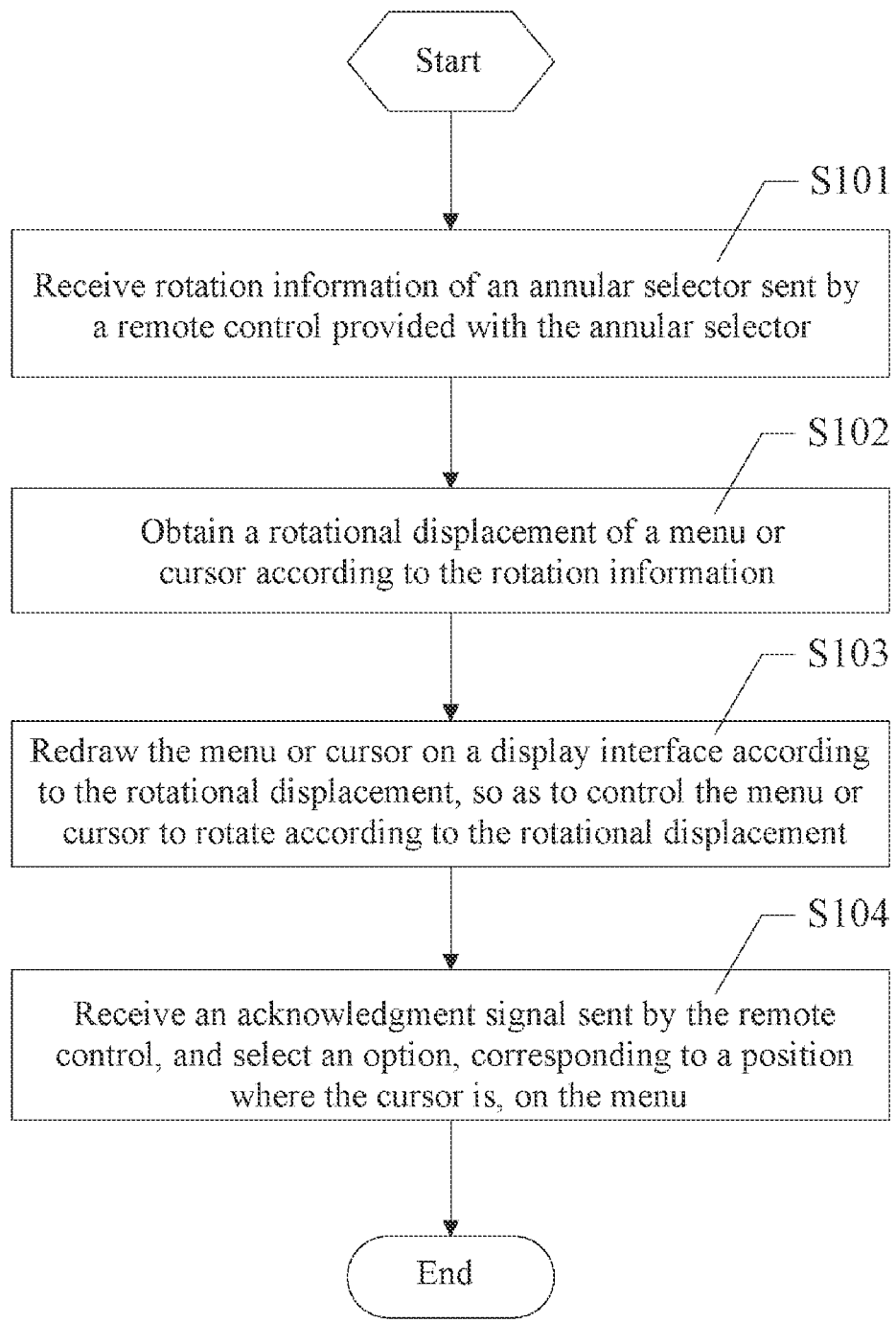
FIG. 1 is a flow chart of a method for annular-selector based television interaction according to a first embodiment of the present invention.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are configured to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only configured to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules may be executed using a single (shared) processor. In addition, some or all code from multiple modules may be stored by a single (shared) memory. The term "group", as used herein, means that some or all code from a single module may be executed using a group of processors. In addition, some or all code from a single module may be stored using a group of memories.

The description will be made as to the embodiments of the present disclosure in conjunction with the accompanying drawings in FIGS. 1-8. It should be understood that specific embodiments described herein are merely used for explaining the present invention, but are not intended to limit the present invention. In accordance with the purposes of this disclosure, as embodied and broadly described herein, this invention, in one aspect, relates to method, apparatus and remote control for annular-selector based television interaction.

Referring to FIG. 1, a flow chart of a method for annular-selector based television interaction is shown according to a first embodiment of the present invention. In this exemplary embodiment, the method includes the following steps.

At step S101: rotation information of an annular selector sent by a remote control is received by an interaction apparatus of a television.

Figure 9:
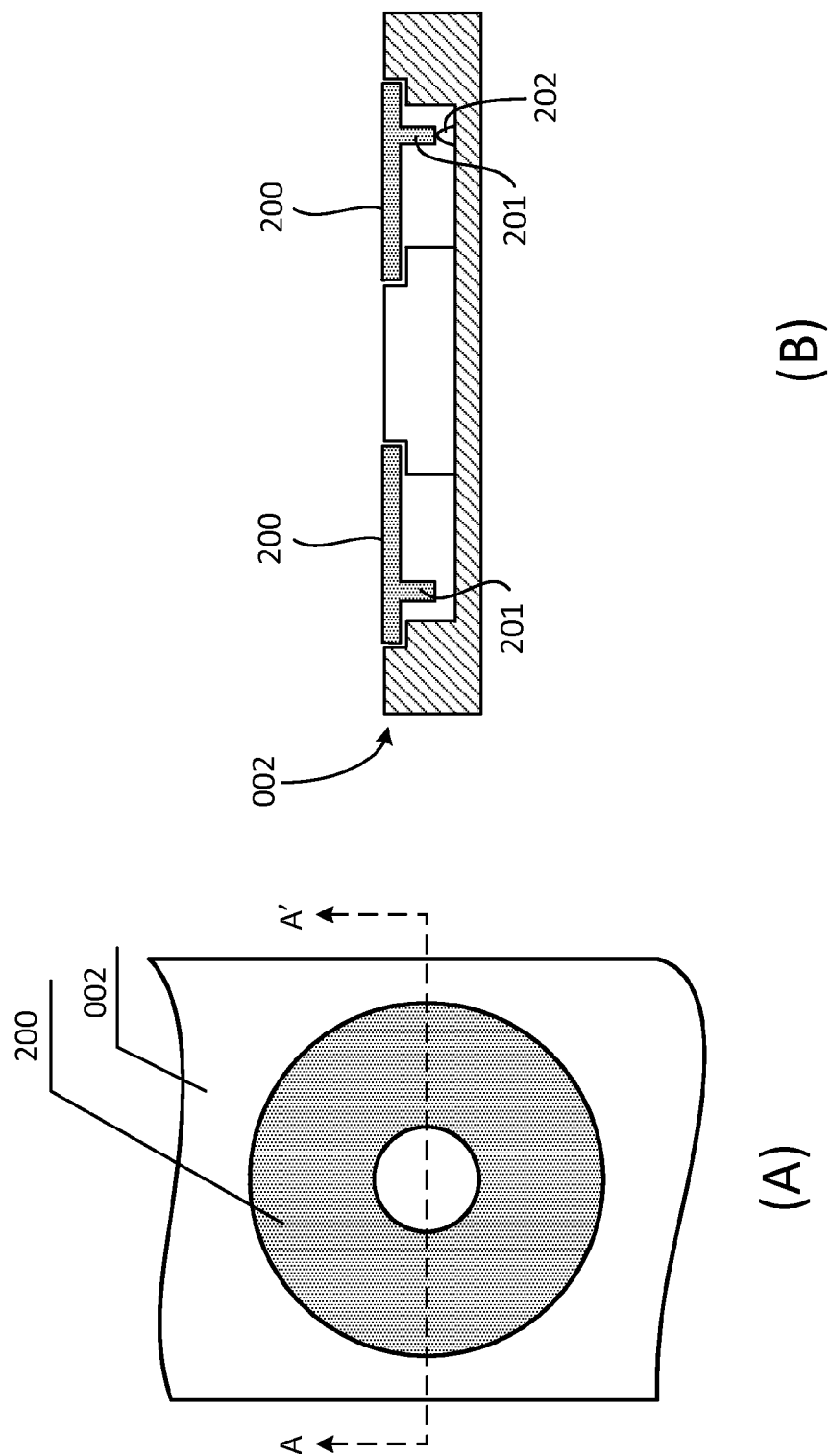
FIG. 9 is a schematic structural view of a remote control with an annular selector according to one embodiment of the present invention, (A) a partial top view, and (B) a cross-sectional view along A-A' line.

The remote control is provided with an annular selector, that is, an annular jog operation key. The annular selector may rotate clockwise or counterclockwise around a circumference. In operation, the remote control sends the acquired rotation information of the annular selector to the interaction apparatus of the television, and the interaction apparatus controls, according to the rotation information, rotation of a menu or cursor on a display interface. The rotation information includes a rotational direction. For example, clockwise rotation is forward rotation, and counterclockwise rotation is reverse rotation. The rotation information may further include a rotational speed. For example, a circumferential displacement, by which a certain marked position of the annular selector rotates per unit time, is acquired through a displacement sensor, and the rotational speed is determined according to a relationship between the displacement and the time. Alternatively, in an exemplary embodiment of the remote control 002 shown in FIG. 9, multiple striking pins 201 are disposed on the annular selector 200, and the number of strikes of the striking pins 201 per unit time and a preset spacing distance between the striking pins 201 are acquired, so as to obtain a circumferential displacement by which the annular selector 200 rotates, thereby determining the rotational speed. For example, the preset spacing distance between the striking pins 201 may be pre-defined; and the number of strikes of the striking pins 201 per unit time can be obtained by a detector or sensor 202 disposed under the striking pins 201.

At step S102: a rotational displacement of the menu or cursor according to the rotation information is obtained.

On the display interface, the shape of the menu is designed to be annular or arc-shaped. A cursor layer and a menu layer on the display interface of the television overlap, such that a certain option of the menu on which the cursor falls is in a highlighted state. The television may adopt two methods to control selection of the menu on the display interface. In one embodiment, the position of the cursor is fixed, and the interaction apparatus of the television analyzes the rotation information of the annular selector to obtain the rotational displacement of the menu, so as to control rotation of the menu. In the other embodiment, the position of the menu is fixed, the interaction apparatus of the television obtains the rotational displacement of the cursor, so as to control rotation of the cursor.

At step S103: the menu or cursor is redrawn on the display interface according to the rotational displacement, so as to control the menu or cursor to rotate according to the rotational displacement.

For design of an animation of the menu or cursor, in conjunction with operation of the annular selector, the animation of the menu or cursor is designed to have a rotational effect. When the annular selector on the remote control rotates, the rotational displacement of the menu or cursor is calculated according to different speed levels, and the menu or cursor is redrawn according to the rotational displacement. When a rotational displacement is incurred, the television draws the menu or cursor once for each passed preset time T, which is reflected on the display interface by that the menu or cursor performs circumferential rotation at a corresponding speed, and if the menu is bar-shaped, is reflected on the display interface by that the menu or cursor switches or jumps at a corresponding speed.

At step S104: a confirmation signal sent by the remote control is received, and an option, corresponding to a position where the cursor is, on the menu is then selected.

After the menu or cursor stops rotation, the cursor stops on a certain option on the menu. If the option is an item required by the user, after the user clicks an Ok button of the annular selector, the remote control sends the confirmation signal to the television, and the television completes the selection. Further, when the menu or cursor rotates, if Ok, Up, Down, Left, or Right button of the annular selector is clicked, the menu or cursor on the display interface stops rotation immediately, thereby achieving precise positioning.

In this embodiment, the annular selector is configured to select content. When the annular selector is rotated rapidly, the speed of the jumping by the cursor between different contents on the menu increases, and when the rotation action stops, precise positioning can be achieved. For operational design of the annular selector of the remote control, a visual menu interface is also expressed in an annular manner, and an annular rotational animation is also adopted for an animation effect, so that an action incurred by the user operating the remote control is consistent with a result seen on the television interface by the user. The physical operation and the visual effect match each other, the operation is simple, and the display is intuitive, so as to greatly reduce operation complexity and fatigue, thereby effectively improving a human-computer interaction experiences.

Figure 2:
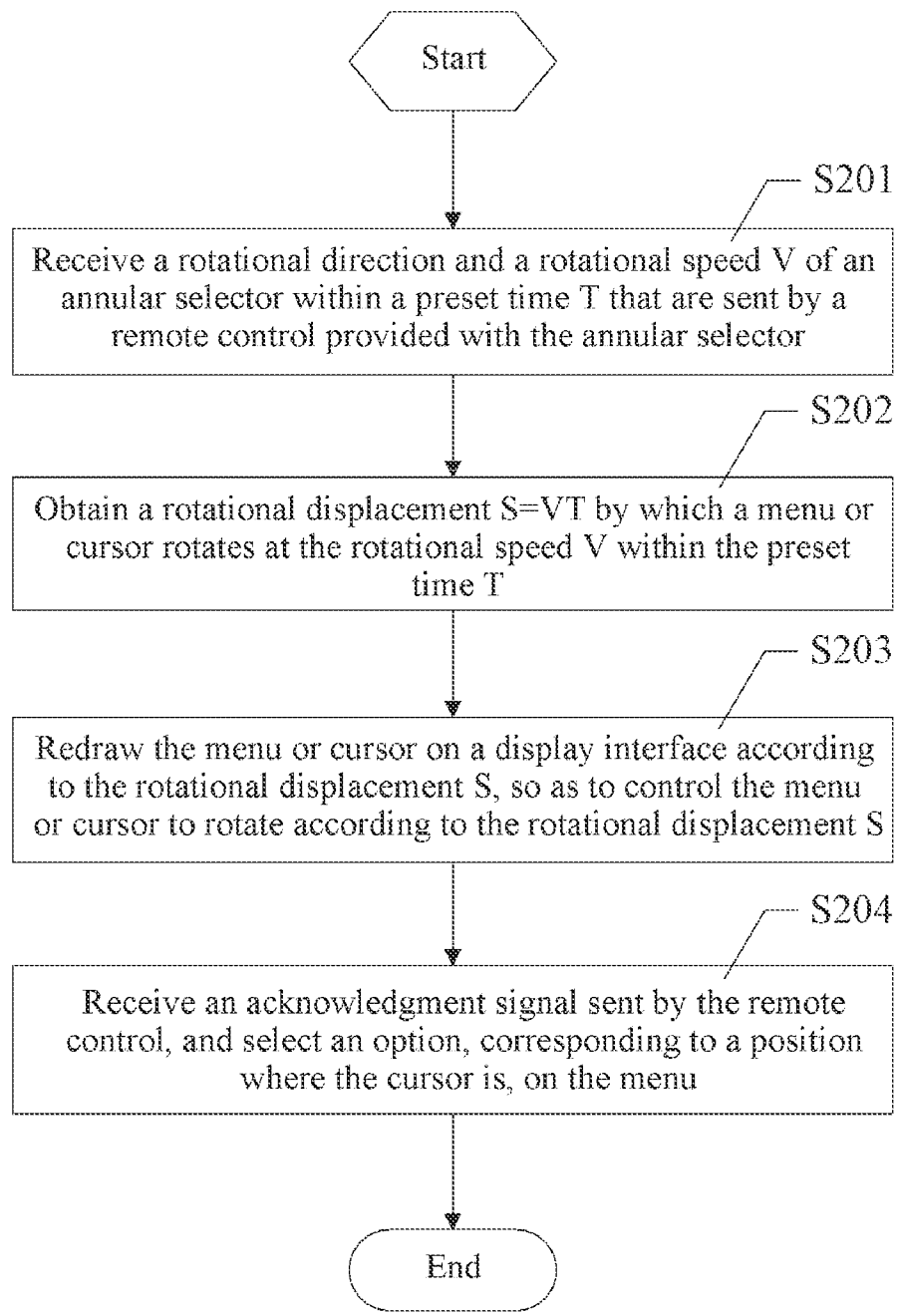
FIG. 2 is a flow chart of the method for annular-selector based television interaction according to a second embodiment of the present invention.

FIG. 2 is a flow chart of a second embodiment of the method for annular-selector based television interaction according to the present invention. The method in this embodiment includes the following steps.

At step S201: Receiving a rotational direction and a rotational speed V of an annular selector within a preset time T that are sent by a remote control provided with the annular selector.

At step S202: Obtaining a rotational displacement S=V×T by which a menu or cursor rotates at the rotational speed V within the preset time T.

According to the rotational direction and the rotational speed of the annular selector, different levels of speed are output. Different levels of speed have different key values. Upon receiving the key values, the television may first input speed values to a physical mechanical model, output different speeds and acceleration after simulation calculation of the mechanical model, and then use the states to control a rotational state of the annular selector and a switch state between various menu options. In order to make the menu or cursor be reflected on a display interface by continuous rotation, the preset time T may be set to a small value, for example, 0.1 second, the remote control acquires the rotational speed of the annular selector for each 0.1 second, and within the 0.1 second, it may be regarded that the annular selector performs uniform rotation at the rotational speed V, to which the menu or cursor of the television corresponds, so that the menu or cursor also performs uniform rotation at the rotational speed V within the 0.1 second.

At step S203: Redrawing the menu or cursor on the display interface according to the rotational displacement S, so as to control the menu or cursor to rotate according to the rotational displacement S.

At step S204: Receiving a confirmation signal sent by the remote control, and select an option, corresponding to a position where the cursor is, on the menu.

In this embodiment, in order to best simulate a realistic state of jog operation key rotation on the annular selector, the physical mechanical model is introduced to the television processing the display interface, to simulate a motion state of the annular selector in a real state. When the annular selector is rotated at a certain speed, rotation of the same speed shall be reflected on a ring or ring-shaped menu or cursor, and switching of the same speed shall be reflected on other strip-shaped menu options. When the rotation is not stopped yet and a certain speed is provided again, the rotation or switching shall obtain certain acceleration, and acceleration or deceleration of the rotation or switching is performed, thereby effectively improving a human-computer interaction experiences.

Figure 3:
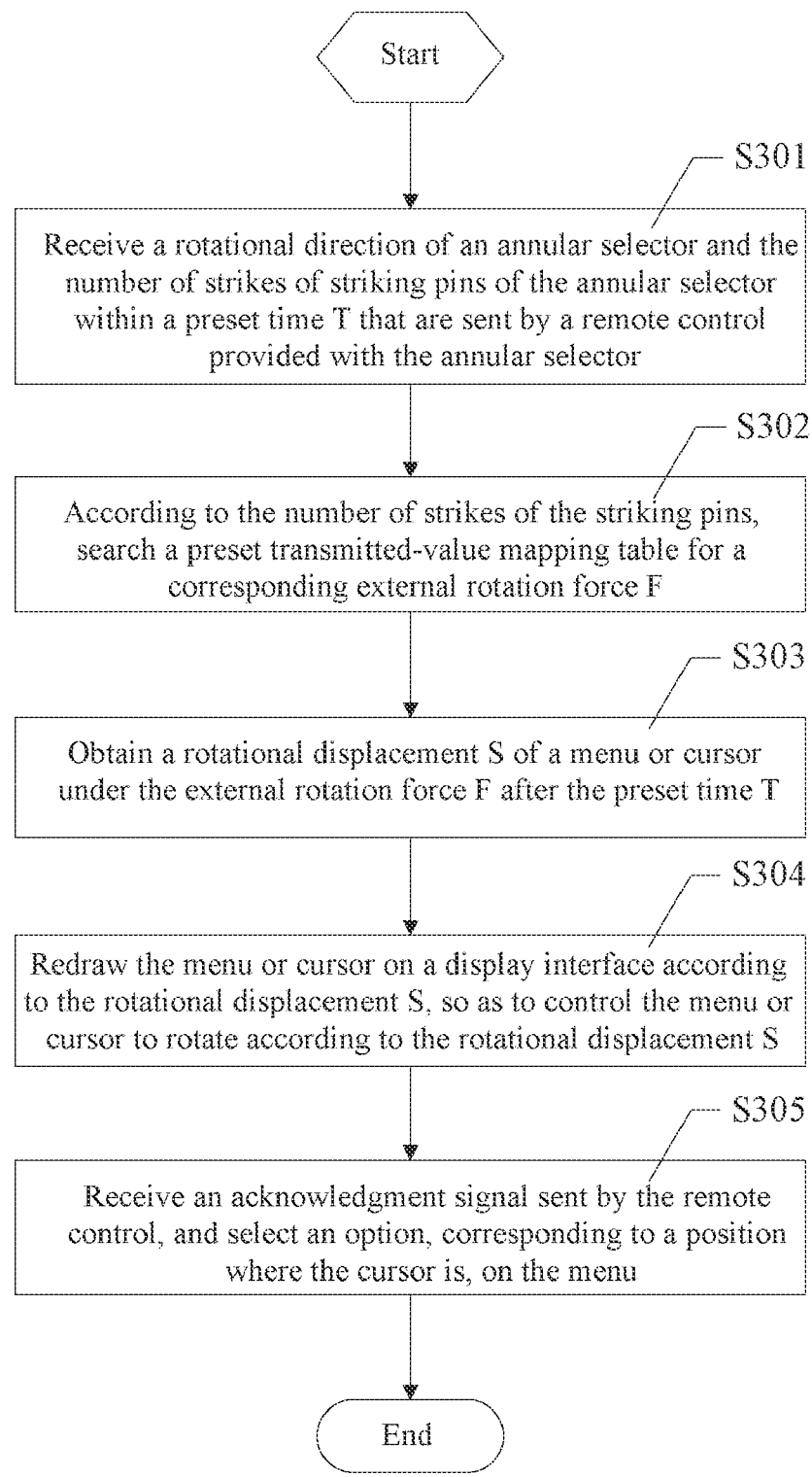
FIG. 3 is a flow chart of the method for annular-selector based television interaction according to a third embodiment of the present invention.

FIG. 3 shows a flow chart of a third embodiment of the method for annular-selector based television interaction according to the present invention.

At step S301: Receiving a rotational direction of an annular selector and the number of strikes of striking pins of the annular selector within a preset time T that are sent by a remote control provided with the annular selector.

While a user is sliding the annular selector, the remote control acquires, within the preset time T, the number of strikes on the internal striking pins of the annular selector, so as to transmit a value to a processor of a television for processing. During the process, if the annular selector slides faster, the number of strikes on the striking pins increases, and the transmitted value increases.

At step S302: According to the number of strikes of the striking pins, searching a preset transmitted-value mapping table for a corresponding external rotation force F.

The television may obtain a rotational speed of the annular selector according to the number of strikes of the striking pins. As a sliding speed changes gradually, a value may be mapped to within a given range, and according to a relationship between a speed and a force, the external force applied to the annular selector may be simulated. The transmitted-value mapping table is preset in the television. For example, when the number of strikes on the striking pins of the annular selector within the preset time T is 10-15, the force is 1.3 N. Therefore, a jog operation key transmitted-value mapping table in the following may be obtained.

|  | Number of strikes of striking pins within a time T | | | | | |
| --- | --- | --- | --- | --- | --- | --- |
|  | 10-20 (counter-clockwise) | 20-30 (counter-clockwise) | 30-40 (counter-clockwise) | 10-20 (clockwise) | 20-30 (clockwise) | 30-40 (clockwise) |
| External rotation force | −1.3 N | −3.45 N | −5.45 N | 1.3 N | 3.45 N | 5.45 N |

At step S303: Obtaining a rotational displacement S of a menu or cursor under the external rotation force F after the preset time T.

The television simulates a rotation process of the menu or cursor under the external rotation force F in a physical mechanical model, acceleration $a_1=(F-f)/M$, where f is a preset frictional force applied to the menu or cursor, M is preset mass of the menu or cursor. The following three situations are included: in a situation where an initial rotational speed is 0, the rotational direction of the annular selector determines that the menu or cursor performs accelerated motion in the rotational direction, and the rotational displacement $S=a_1 T^2/2$; in a situation where the initial rotational speed is not 0, a rotational direction consistent with the direction of the initial rotational speed $V_0$ may make the menu or cursor perform accelerated motion in the rotational direction, and the rotational displacement $S=V_0 T+a_1 T^2/2$; in a situation where the initial rotational speed is not 0, a rotational direction opposite to the direction of the initial rotational speed may make the menu or cursor perform retarded motion in the direction opposite to the rotational direction, and the rotational displacement $S=V_0 T-a_1 T^2/2$, until the menu or cursor stops or performs acceleration in the opposite direction.

At step S304: Redrawing the menu or cursor on the display interface according to the rotational displacement S, so as to control the menu or cursor to rotate according to the rotational displacement S.

At step S305: Receiving a confirmation signal sent by the remote control, and select an option, corresponding to a position where the cursor is, on the menu.

In this embodiment, when the annular selector is in acceleration, the rotational displacement output by the physical model is configured to control the rotational state of the menu or cursor or switching of other options. Through cooperation between the annular selector and the menu/cursor, when the number of options is large or very large, the user may perform rapid rotation or accelerated rotation, so that the annular selector or other option can be rapidly positioned near a target option, and then through a immediate halt, reverse motion or slow motion, precisely positioned on the target option, thereby not only bringing rapidness and convenience to selection, but also greatly improving selection accuracy.

Figure 4:
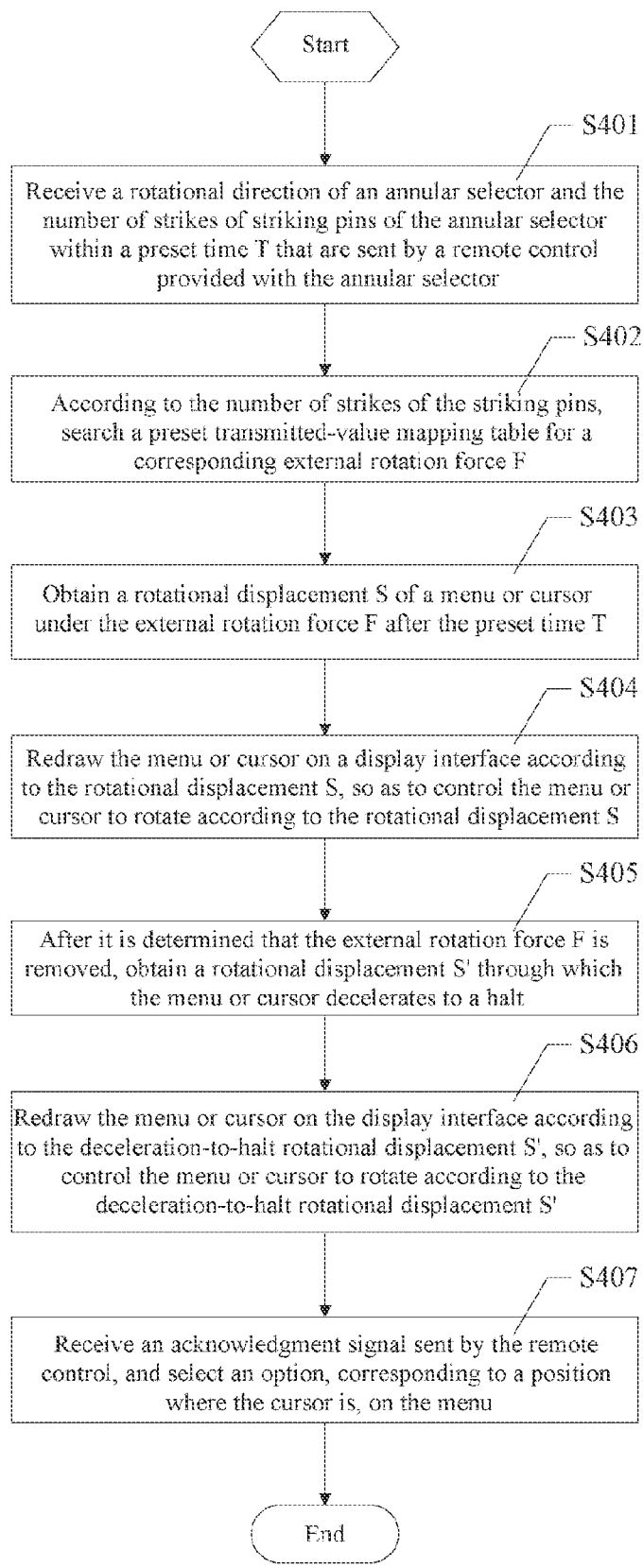
FIG. 4 is a flow chart of the method for annular-selector based television interaction according to a fourth embodiment of the present invention.

As shown in FIG. 4, a flow chart of the method for annular-selector based television interaction is shown according to a fourth embodiment of the present invention. The method includes the following steps.

At step S401: Receiving a rotational direction of an annular selector and the number of strikes of striking pins of the annular selector within a preset time T that are sent by a remote control provided with the annular selector.

At step S402: According to the number of strikes of the striking pins, searching a preset transmitted-value mapping table for a corresponding external rotation force F.

At step S403: Obtaining a rotational displacement S of a menu or cursor under the external rotation force F after the preset time T.

At step S404: Redrawing the menu or cursor on a display interface according to the rotational displacement S, so as to control the menu or cursor to rotate according to the rotational displacement S.

At step S405: After it is determined that the external rotation force F is removed, obtaining a rotational displacement S' through which the menu or cursor decelerates to a halt.

At step S406: Redrawing the menu or cursor on the display interface according to the deceleration-to-halt rotational displacement S', so as to control the menu or cursor to rotate according to the deceleration-to-halt rotational displacement S'.

After the external rotation force F is removed, a television simulates a deceleration process, where the menu or cursor is only subject to a frictional force f, in a physical mechanical model, acceleration $a_2=f/M$, where f is a preset frictional force applied to the menu or cursor, and M is preset mass of the menu or cursor. The direction of the frictional force f is opposite to that of an initial rotational speed $V_0$, the rotational displacement $S'=V_0 T-a_2 T^2/2$ until a halt is reached.

At step S407: Receiving a confirmation signal sent by the remote control, and select an option, corresponding to a position where the cursor is, on the menu.

In this embodiment, rotation of a realistic dial is simulated, and different rotational speeds incur different effects. For no matter slow rotation or rapid rotation, a deceleration process subject to constant damping shall always follow the stop of the rotation. A short deceleration process follows the stop of the slow rotation, and a long deceleration process follows the stop of the rapid rotation. When a jog operation key is rotated again, and if rotation of the jog operation key is not stopped yet at the moment, acceleration shall be obtained again, and accelerated rotation is performed. After the physical mechanical model is added, manipulation of the menu or cursor can best simulate a realistic state, so that a user uses the annular selector in a most natural state. When the annular selector is rotated, the menu or cursor on the television is like a real dial, and can be rotated arbitrarily; or during switching of other bar-shaped menu options, experience of rapidness and slowness can be obtained. The operation by the hand of the user is completely converted into an effect viewed on the television, so as to comply with operation habits of the user, thereby incurring desirable experience.

Figure 5:
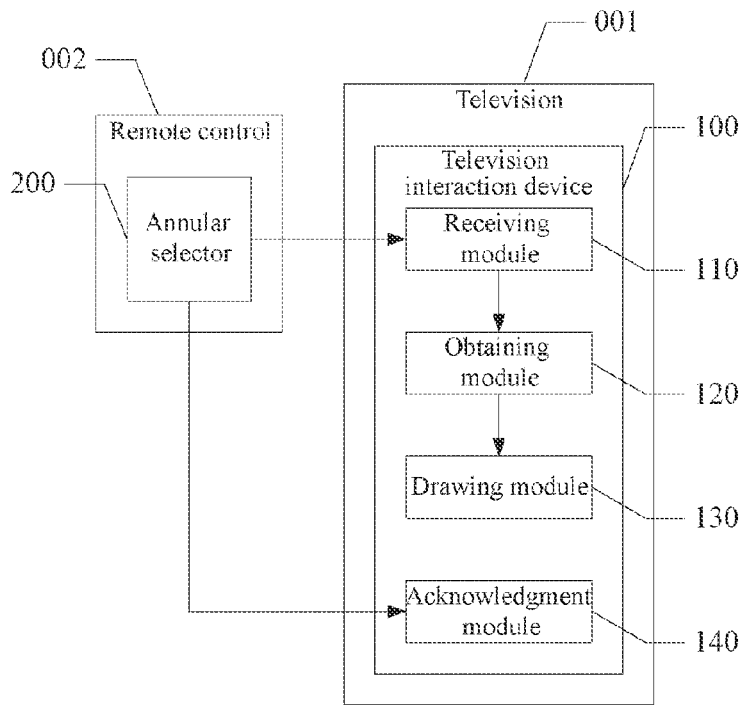
FIG. 5 is a schematic structural view of an apparatus for annular-selector based television interaction according to a first embodiment of the present invention.

Referring to FIG. 5, a schematic structural view of an apparatus for annular-selector based television interaction is shown according to a first embodiment of the present invention. In the embodiment, the apparatus 100 is disposed in a television 001, and includes a receiving module 110, configured to receive rotation information of an annular selector 200 sent by a remote control 002 provided with the annular selector 200; an obtaining module 120, configured to obtain a rotational displacement S of a menu or cursor according to the rotation information; a drawing module 130, configured to redraw the menu or cursor on a display interface according to the rotational displacement S, so as to control the menu or cursor to rotate according to the rotational displacement S; and a confirmation module 140, configured to receive a confirmation signal sent by the remote control 002, and select an option, corresponding to a position where the cursor is, on the menu.

In this embodiment, the remote control 002 is provided with the annular selector 200, that is, an annular jog operation key. The annular selector 200 may rotate clockwise or counterclockwise around a circumference. The remote control 002 sends the acquired rotation information of the annular selector 200 to the receiving module 110. The television 001 controls, according to the rotation information, rotation of the menu or cursor on the display interface. The rotation information includes a rotational direction. For example, clockwise rotation is forward rotation, and counterclockwise rotation is reverse rotation. The rotation information may further include a rotational speed. For example, a circumferential displacement, by which a certain marked position of the annular selector 200 rotates per unit time, is acquired through a displacement sensor, and the rotational speed is determined according to a relationship between the displacement and the time; alternatively, multiple striking pins are disposed on the annular selector 200, and the number of strikes of the striking pins per unit time and a preset spacing distance between the striking pins are acquired, so as to obtain a circumferential displacement by which the annular selector 200 rotates, thereby determining the rotational speed. On the display interface, the menu is designed to be annular or arc-shaped. A cursor layer and a menu layer on the display interface of the television overlap, and the cursor falls on the menu, which is reflected on the display interface by that a certain option on the menu is in a highlighted state. The television 001 may adopt two methods to control selection of the menu on the display interface. In one method, the position of the cursor is fixed, and the obtaining module 120 analyzes the rotation information of the annular selector 200 to obtain the rotational displacement S of the menu, so as to control rotation of the menu. In the other method, the position of the menu is fixed, the obtaining module 120 obtains the rotational displacement S of the cursor, so as to control rotation of the cursor.

For design of an animation of the menu or cursor, in conjunction with operation of the annular selector 200, the animation of the menu or cursor is designed to have a rotational effect. When the annular selector 200 on the remote control 002 rotates, the television 001 uses the obtaining module 120 to calculate the rotational displacement S of the menu or cursor according to different speed levels, and uses the drawing module 130 to redraw the menu or cursor. When a rotational displacement S is incurred, the drawing module 130 draws the menu or cursor once for each passed preset time T, which is reflected on the display interface by that the menu or cursor performs circumferential rotation at a corresponding speed, and if the menu is bar-shaped, is reflected on the display interface by that the menu or cursor switches or jumps at a corresponding speed. After the menu or cursor stops rotation, the cursor stops on a certain option on the menu. If the option is an item required by a user, after the user clicks an Ok button of the annular selector 200, the remote control 002 sends the confirmation signal to the confirmation module 140, and the television 001 completes the selection. Further, when the menu or cursor rotates, if Ok, Up, Down, Left, or Right button of the annular selector 200 is clicked, the menu or cursor on the display interface stops rotation immediately, thereby achieving precise positioning.

In this embodiment, the annular selector 200 is configured to select content. When the annular selector 200 is rotated rapidly, the television 001 increases the speed of the jumping by the cursor between different contents on the menu, and when the rotation action stops, precise positioning can be achieved. For operational design of the annular selector 200 of the remote control 002, the television 001 express a visual menu interface also in an annular manner, and an annular rotational animation is also adopted for an animation effect, so that an action incurred by the user operating the remote control 002 is consistent with a result seen on the television interface by the user. The physical operation and the visual effect match each other, the operation is simple, and the display is intuitive, so as to greatly reduce operation complexity and fatigue, thereby effectively improving a human-computer interaction experiences.

Figure 6:
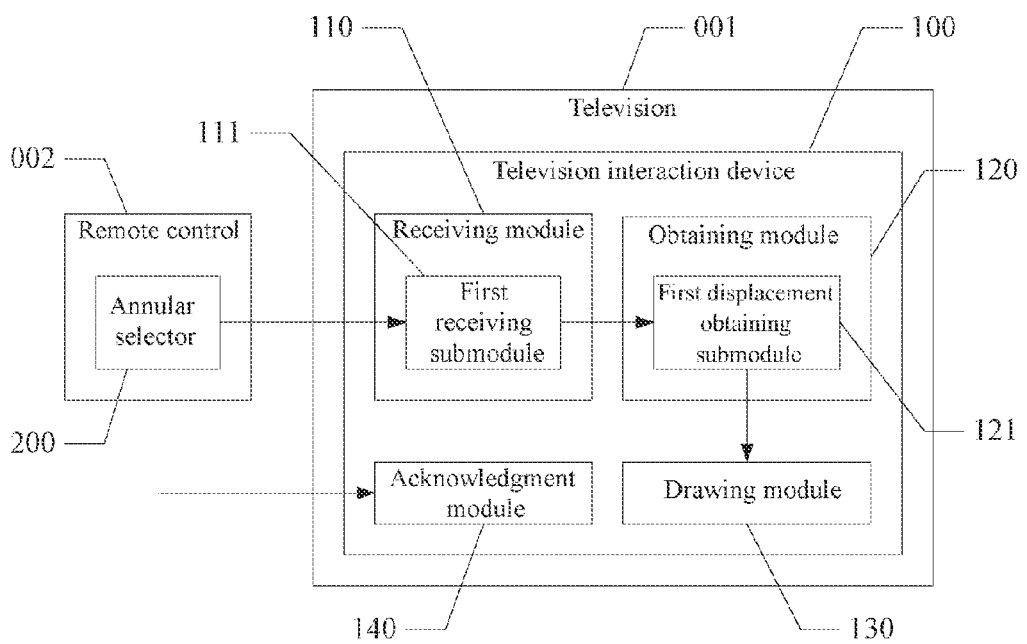
FIG. 6 is a schematic structural view of the apparatus for annular-selector based television interaction according to a second embodiment of the present invention.

FIG. 6 shows a schematic structural view of a second embodiment of the apparatus for annular-selector based television interaction according to the present invention. The apparatus disposed in a television 001, among other things, includes a receiving module 110, an obtaining module 120, a drawing module 130, and a confirmation module 140.

In one embodiment, the receiving module 110 includes a first receiving sub-module 111, configured to receive a rotational direction and a rotational speed V of an annular selector 200 within a preset time T that are sent by a remote control 002 provided with the annular selector 200.

The obtaining module 120 includes a first displacement obtaining sub-module 121, configured to obtain a rotational displacement S=VT of a menu or cursor within the preset time T when the menu or cursor rotates at the rotational speed V.

In this embodiment, according to the rotational direction and the rotational speed of the annular selector 200, different levels of speed are output. Different levels of speed have different key values. After the first receiving sub-module 111 receives the key values, the first displacement obtaining sub-module 121 may first input speed values to a physical mechanical model, output different speeds and acceleration after simulation calculation of the mechanical model, and then use the states to control a rotational state of the annular selector 200 and a switch state between various menu options. In order to make the menu or cursor be reflected on a display interface by continuous rotation, the preset time T may be set to a small value, for example, 0.1 second, the remote control 002 acquires the rotational speed of the annular selector 200 for each 0.1 second, and within the 0.1 second, it may be regarded that the annular selector 200 performs uniform rotation at the rotational speed V, to which the menu or cursor of the television 001 corresponds, so that the menu or cursor also performs uniform rotation at the rotational speed V within the 0.1 second. In this embodiment, in order to best simulate a realistic state of jog operation key rotation on the annular selector 200, the physical mechanical model is introduced to the television 001 processing the display interface, to simulate a motion state of the annular selector 200 in a real state. When the annular selector 200 is rotated at a certain speed, rotation of the same speed shall be reflected on a ring or ring-shaped menu or cursor, and switching of the same speed shall be reflected on other strip-shaped menu options. When the rotation is not stopped yet and a certain speed is provided again, the rotation or switching shall obtain certain acceleration, and acceleration or deceleration of the rotation or switching is performed, thereby effectively improving a human-computer interaction experiences.

Figure 7:
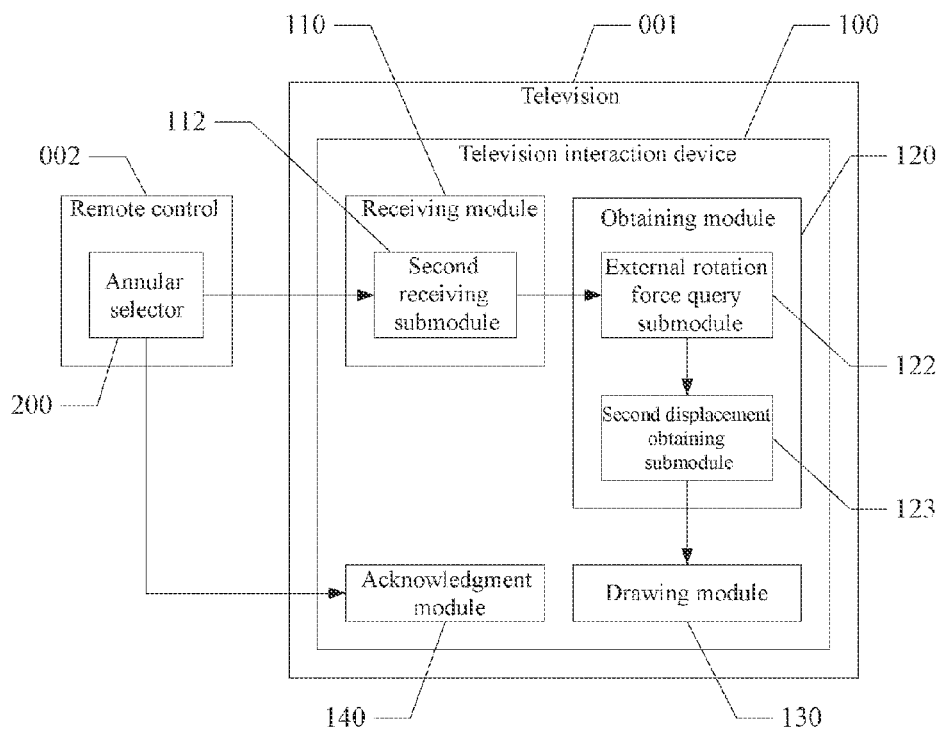
FIG. 7 is a schematic structural view of the apparatus for annular-selector based television interaction according to a third embodiment of the present invention.

FIG. 7 shows a schematic structural view of a third embodiment of the apparatus for annular-selector based television interaction according to the present invention.

In this embodiment, the receiving module 110 includes a second receiving sub-module 112, configured to receive a rotational direction of an annular selector 200 and the number of strikes of striking pins of the annular selector 200 within a preset time T that are sent by a remote control 002 provided with the annular selector 200.

The obtaining module 120 includes an external rotation force query sub-module 122, configured to, according to the number of strikes of the striking pins, search a preset transmitted-value mapping table for a corresponding external rotation force F; and a second displacement obtaining sub-module 123, configured to obtain a rotational displacement S of a menu or cursor under the external rotation force F after the preset time T.

In this embodiment, while the annular selector 200 is sliding, the remote control 002 acquires, within the preset time T, the number of strikes on the internal striking pins of the annular selector 200, so as to transmit a value to the second receiving sub-module 112. If the annular selector 200 slides faster, the number of strikes on the striking pins increases, and the transmitted value increases. The external rotation force query sub-module 122 may obtain a rotational speed of the annular selector 200 according to the number of strikes of the striking pins. As a sliding speed changes gradually, a value may be mapped to within a given range, and according to a relationship between a speed and a force, the external force applied to the annular selector 200 may be simulated. The transmitted-value mapping table is preset in the television 001. For example, when the number of strikes on the striking pins of the annular selector 200 within the preset time T is 10-15, the force is 1.3 N. Therefore, a jog operation key transmitted-value mapping table in the following may be obtained.

of the annular selector 200 determines that the menu or cursor performs accelerated motion in the rotational direction, and the rotational displacement $S=a_1T^2/2$; in a situation where the initial rotational speed is not 0, a rotational direction consistent with the direction of the initial rotational speed $V_0$ may make the menu or cursor perform accelerated motion in the rotational direction, and the rotational displacement $S=V_0 T+a_1T^2/2$; in a situation where the initial rotational speed is not 0, a rotational direction opposite to the direction of the initial rotational speed may make the menu or cursor perform retarded motion in the direction opposite to the rotational direction, and the rotational displacement $S=V_0 T-a_1T^2/2$, until the menu or cursor stops or performs acceleration in the opposite direction.

In this embodiment, when the annular selector 200 is in acceleration, the rotational displacement output by the physical model is configured to control the rotational state of the menu or cursor or switching of other options. Through cooperation between the annular selector 200 and the menu/cursor, when the number of options is large or very large, the user may perform rapid rotation or accelerated rotation, so that the annular selector 200 or other option can be rapidly positioned near a target option, and then through a immediate halt, reverse motion or slow motion, precisely positioned on the target option, thereby not only bringing rapidness and convenience to selection, but also greatly improving selection accuracy.

Figure 8:
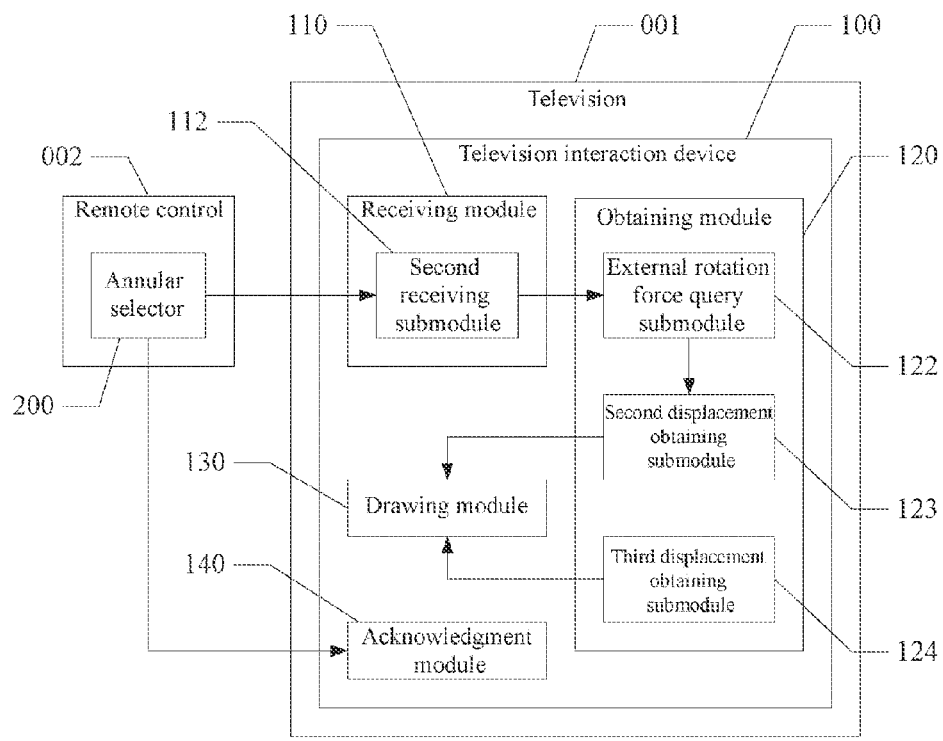
FIG. 8 is a schematic structural view of the apparatus for annular-selector based television interaction according to a fourth embodiment of the present invention.

Referring to FIG. 8, a schematic structural view of a fourth embodiment of the apparatus for annular-selector based television interaction is shown according to the present invention.

In this embodiment, the obtaining module 120 further includes a third displacement obtaining sub-module 124, configured to, after it is determined that the external rotation force F is removed, obtain a rotational displacement S' through which a menu or cursor decelerates to a halt.

The drawing module 130 is further configured to redraw the menu or cursor on the display interface according to the deceleration-to-halt rotational displacement S', so as to control the menu or cursor to rotate according to the deceleration-to-halt rotational displacement S'.

In this embodiment, after the external rotation force F is removed, the third displacement obtaining sub-module 124 simulates a deceleration process, where the menu or cursor is only subject to a frictional force f, in a physical mechanical model, acceleration $a_2=f/M$, where f is a preset frictional force applied to the menu or cursor, and M is preset mass of the menu or cursor. The direction of the frictional force f is opposite to that of an initial rotational speed $V_0$, the rotational

|  | Number of strikes of striking pins within a time T | | | | | |
| --- | --- | --- | --- | --- | --- | --- |
|  | 10-20 (counter-clockwise) | 20-30 (counter-clockwise) | 30-40 (counter-clockwise) | 10-20 (clockwise) | 20-30 (clockwise) | 30-40 (clockwise) |
| External rotation force | −1.3 N | −3.45 N | −5.45 N | 1.3 N | 3.45 N | 5.45 N |

The second displacement obtaining sub-module 123 simulates a rotation process of the menu or cursor under the external rotation force F in a physical mechanical model, acceleration $a_1=(F-f)/M$, where f is a preset frictional force applied to the menu or cursor, M is preset mass of the menu or cursor. The following three situations are included: in a situation where an initial rotational speed is 0, the rotational direction displacement $S'=V_0 T-a_2T^2/2$ until a halt is reached. In this embodiment, the third displacement obtaining sub-module 124 simulates rotation of a realistic dial, and different rotational speeds incur different effects. For no matter slow rotation or rapid rotation, a deceleration process subject to constant damping shall always follow the stop of the rotation. A short deceleration process follows the stop of the slow rotation, and a long deceleration process follows the stop of the rapid rotation. When a jog operation key is rotated again, and if rotation of the jog operation key is not stopped yet at the moment, acceleration shall be obtained again, and accelerated rotation is performed. After the physical mechanical model is added, manipulation of the menu or cursor can best simulate a realistic state, so that a user uses the annular selector 200 in a most natural state. When the annular selector 200 is rotated, the menu or cursor on the television is like a real dial, and can be rotated arbitrarily; or during switching of other bar-shaped menu options, experience of rapidness and slowness can be obtained. The operation by the hand of the user is completely converted into an effect viewed on the television, so as to comply with operation habits of the user, thereby incurring desirable experience.

One aspect of the present invention provided a remote control used in associated with the above apparatus for television interaction. In one embodiment, the remote control includes an annular selector, operably rotatable clockwise or counterclockwise; means for acquiring rotation information of the annular selector; and a transmitter for sending the acquired rotation information of the annular selector to the apparatus that controls, according to the rotation information of the annular selector, rotation of a menu or cursor on a display interface on a television, and for sending a confirmation signal to the apparatus when a certain option of the menu on which the cursor falls is selected. The rotation information comprises at least one of a rotational direction, a rotational speed, and a circumferential displacement. In one embodiment, the annular selector comprises an annular jog operation key.

The remote control may further include a confirmation key coupled with the transmitter such that the transmitter sends the confirmation signal to the apparatus when the confirmation key is activated.

In one embodiment, the means for the acquiring rotation information of the annular selector comprises one or more sensors.

In another embodiment, the means for the acquiring rotation information of the annular selector comprises a plurality of striking pins disposed on the annular selector, wherein the number of strikes of the striking pins per unit time and a preset spacing distance between the striking pins are acquired, so as to obtain a circumferential displacement by which the annular selector rotates, thereby determining the rotational speed.

The remote control in one embodiment further includes a confirmation key coupled with the transmitter such that the transmitter sends the confirmation signal to the apparatus when the confirmation key is activated.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for annular-selector based television interaction, comprising:
   receiving rotation information of an annular selector sent by a remote control provided with the annular selector;
   obtaining a rotational displacement of a menu or cursor on a display interface of a television according to the rotation information;
   redrawing the menu or cursor on the display interface according to the rotational displacement, so as to control the menu or cursor to rotate according to the rotational displacement; and
   receiving a confirmation signal sent by the remote control, and selecting an option, corresponding to a position in which the cursor is, on the menu,
   wherein the step of receiving the rotation information of the annular selector sent by the remote control provided comprises:
   receiving a rotational direction of the annular selector and the number of strikes of striking pins of the annular selector within a preset time that are sent by the remote control provided with the annular selector; and
   wherein the step of obtaining the rotational displacement of the menu or cursor according to the rotation information comprises:
   according to the number of strikes of the striking pins of the annular selector, searching a preset transmitted-value mapping table for a corresponding external rotation force; and
   obtaining the rotational displacement of the menu or cursor on a display interface under the external rotation force after the preset time.

2. The method according to claim 1, after the step of redrawing the menu or cursor on the display interface according to the rotational displacement, so as to control the menu or cursor to rotate according to the rotational displacement, further comprising:
   after it is determined that the external rotation force is removed, obtaining the rotational displacement through which the menu or cursor decelerates to a halt; and
   redrawing the menu or cursor on the display interface according to the deceleration-to-halt rotational displacement, so as to control the menu or cursor to rotate according to the deceleration-to-halt rotational displacement.

3. The method according to claim 1, wherein the shape of the menu on the display interface is annular or arc-shaped.

4. The method according to claim 3, wherein a layer of the cursor on the display interface overlaps with a layer of the menu on the display interface, such that a certain option of the menu on which the cursor falls is in a highlighted state.

5. An apparatus for annular-selector based television interaction, comprising:
   a receiving module, configured to receive rotation information of an annular selector sent by a remote control provided with the annular selector;
   an obtaining module, configured to obtain a rotational displacement of a menu or cursor on a display interface of a television according to the rotation information;
   a drawing module, configured to redraw the menu or cursor on the display interface according to the rotational displacement, so as to control the menu or cursor to rotate according to the rotational displacement; and
   a confirmation module, configured to receive a confirmation signal sent by the remote control, and select an option, corresponding to a position in which the cursor is, on the menu, wherein the receiving module specifically comprises:
a second receiving sub-module, configured to receive a rotational direction of the annular selector and the number of strikes of striking pins of the annular selector within a preset time that are sent by the remote control provided with the annular selector, and wherein the obtaining module specifically comprises:
an external rotation force query sub-module, configured to, according to the number of strikes of the striking pins, search a preset transmitted-value mapping table for a corresponding external rotation force; and
a second displacement obtaining sub-module, configured to obtain a rotational displacement of the menu or cursor under the external rotation force after the preset time.

6. The apparatus according to claim 5, wherein the obtaining module further specifically comprises:
a third displacement obtaining sub-module, configured to, after it is determined that the external rotation force is removed, obtain a rotational displacement through which the menu or cursor decelerates to a halt; and
wherein the drawing module is further configured to redraw the menu or cursor on the display interface according to the deceleration-to-halt rotational displacement, so as to control the menu or cursor to rotate according to the deceleration-to-halt rotational displacement.

7. The apparatus according to claim 5, wherein the shape of the menu on the display interface is annular or arc-shaped.

8. The apparatus according to claim 7, wherein a layer of the cursor on the display interface overlaps with a layer of the menu on the display interface, such that a certain option of the menu on which the cursor falls is in a highlighted state.

* * * * *